United States Patent [19]

Golinelli et al.

[11] Patent Number: 4,543,725

[45] Date of Patent: Oct. 1, 1985

[54] RING GAUGE FOR CHECKING EXTERNAL DIMENSIONS

[75] Inventors: Guido Golinelli; Mario Possati, both of Bologna, Italy

[73] Assignee: Finike Italiana Marposs S.p.A., S. Marino di Bentivoglio, Italy

[21] Appl. No.: 608,174

[22] Filed: May 8, 1984

[30] Foreign Application Priority Data

Jun. 10, 1983 [IT] Italy .................. 3458 A/83

[51] Int. Cl.$^4$ ............ G01B 5/08; G01B 7/12
[52] U.S. Cl. .................................. 33/178 E
[58] Field of Search ............. 277/178 E, 178, 178 D

[56] References Cited

U.S. PATENT DOCUMENTS

| | | |
|---|---|---|
| 1,928,457 | 9/1933 | Mershon et al. |
| 3,648,377 | 3/1972 | Witzke ............... 33/178 E |
| 3,808,696 | 5/1974 | Possati ............... 33/178 E |
| 4,348,814 | 9/1982 | Possati et al. |
| 4,385,444 | 5/1983 | Possati et al. |
| 4,386,467 | 6/1983 | Possati et al. |
| 4,389,788 | 6/1983 | Balogh et al. ............ 33/178 E |

FOREIGN PATENT DOCUMENTS

3439A/80 6/1980 Italy.

OTHER PUBLICATIONS

"Heli-Coil" by Celada Fasteners, issued approximately Feb. 1978.

Primary Examiner—Robert I. Smith
Attorney, Agent, or Firm—Stevens, Davis, Miller & Mosher

[57] ABSTRACT

A ring gauge for checking external diametral dimensions comprising an arm-set essentially consisting of an integral member including two arc-shaped arms, two resiliently deformable portions adapted to define fulcrums for the rotation of the arms and an intermediate portion coupled to a support. Two feelers are adjustably fixed to the arms, approximately at intermediate points of their longitudinal development. The elements of a transducer are fixed at the free ends of the arms.

20 Claims, 4 Drawing Figures

RING GAUGE FOR CHECKING EXTERNAL DIMENSIONS

BACKGROUND OF THE INVENTION

1. Field of the Invention

The present invention relates to a ring gauge for checking external diametral dimensions of parts having a surface of rotation, comprising support means; two feelers movable with respect to the support means, the feelers being adapted to touch the part to be checked; two arc-shaped arms coupled to said support means and adapted to support said feelers; and transducer means adapted to provide an electric signal depending on the position of the feelers.

2. Description of the Prior Art

Known ring gauges for checking external diameters comprise a support structure and a ring coupled to the support structure through a flat spring. Fixed to the ring and passing through a hole of it is a cartridge gauging head having a movable feeler protruding internally with respect to the ring. A carbide reference contact or fixed feeler adapted to touch the surface of the part to be checked is fixed to the internal surface of the ring, at a position diametrically opposite that where the movable feeler is arranged. The flat spring permits centering of the ring with respect to the part. Other known ring gauges have a substantially U-shaped arm-set, housed within an annular casing and fixed to the casing so as to perform angular displacements about a point of the casing, for permitting centering of the arm-set with respect to the part. Fixed at the ends of the U and protruding internally with respect to the casing are, respectively, a cartridge type gauging head and a carbide reference contact. These known ring gauges are rather expensive and have large overall dimensions, mainly due to the use of cartridge gauging heads, which moreover may cause incorrect operation due to possible seizures. For zero setting these ring gauges it is necessary to act on the cartridge heads and therefore it is necessary to have skilled operators which have to reach components of the ring gauge not immediately accessible.

SUMMARY OF THE INVENTION

The object of the present invention is to provide a simple and cheap ring gauge having small dimensions and excellent reliability and which can be zero set and quickly and easily used for measurements.

This and other objects and advantages are reached by a ring gauge of the type set forth, wherein said arms are coupled to the support means for performing angular displacements, the feelers are fixed to the arms substantially at intermediate points of their longitudinal development and the arms have free ends in proximity of which there are fixed the transducer means.

BRIEF DESCRIPTION OF THE DRAWINGS

The invention will be described in detail with reference to the accompanying drawing, given by way of non limiting example, wherein.

DETAILED DESCRIPTION

Figure 1:
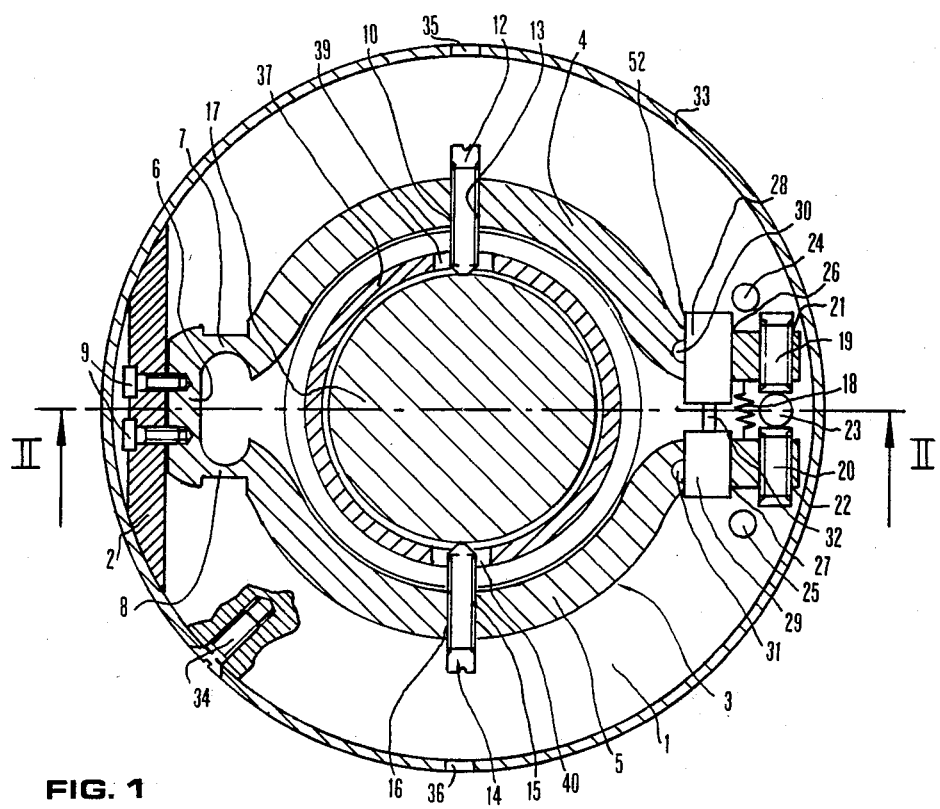
FIG. 1 is a horizontal cross-section of a ring gauge according to a preferred embodiment of the invention.
Figure 2:
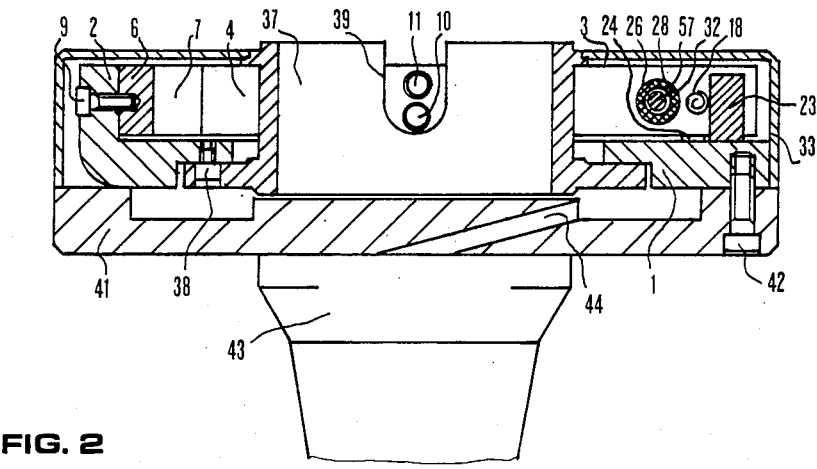
FIG. 2 is a cross-section of the gauge along line II—II of FIG. 1.

As shown in FIGS. 1 and 2, the ring gauge comprises a first support element 1, having substantially an annular shape, i.e. the shape of a circular crown, with a flange 2 arranged along a direction perpendicular to the axis of symmetry of said circular crown.

The arm-set of the gauge comprises an integral element 3 having the shape of an open ring. Element 3 defines two measuring arms 4 and 5 having substantially opposite semicircular shapes, an intermediate linear portion 6, parallel to flange 2, and two portions 7 and 8 connecting relevant first ends of arms 4 and 5 to linear portion 6. Portions 7 and 8 have a reduced thickness so as to be resiliently deformable and define two geometric axes, perpendicular to the plane of FIG. 1. Arms 4 and 5 can perform rotational displacements about these axes.

Portion 6 is fixed to flange 2 through screws 9 and in this way the arm-set of the gauge is secured to support 1. The arrangement of screws 9, which lock the arm-set at its back side, guarantees a high resistance of the arm-set locking with respect to possible impacts along the measurement direction.

A pair of seats i.e. threaded holes having transversal axes is approximately midway of the longitudinal development of each arm 4 and 5; the holes 10 and 11 defined in arm 4 are visible in FIG. 2. In either hole 10 or 11, e.g. in hole 10, there is screwed a feeler 12 (shown only in FIG. 1), frictionally fastened by a self-locking threaded insert 13.

Another feeler 14 is frictionally and threadedly engaged, through a self-locking threaded insert 15, within a hole 16 of arm 5, similar to and coaxial with hole 10 of arm 4.

Feelers 12 and 14 are adapted to touch the cylindrical surface of the part 17 to be checked, along a diametral direction coinciding with the common geometric axis of holes 10 and 16.

Arranged near the free ends of arms 4 and 5, which ends are close to each other, is located a resilient element, i.e. a return spring 18 which urges arms 4, 5 towards each other so as to keep feelers 12 and 14 into contact with part 17.

A device for limiting the angular displacements of arms 4 and 5 is arranged near spring 18; this devices comprises two stop elements, i.e. dowels 19 and 20—threadedly engaged in holes 21 and 22 of arms 4 and 5, respectively—which can contact the lateral surface of a pin 23 fastened to support 1, for adjustably limiting the displacements of arms 4 and 5 along the measurement direction.

Two further stop elements, i.e. pins 24 and 25 fixed to support 1 are arranged at relevant sides of the free ends of arms 4 and 5 for limiting the opening displacements of arms 4 and 5, i.e. along the direction opposite to the measurement direction, by contacting these free ends.

Located within through holes 26 and 27 of arms 4 and 5 are two elements or supports 28 and 29, which are locked by pins housed in holes 30 and 31 having geometric axes perpendicular to those of holes 26 and 27. Support 28 houses the electric windings 57 of a differential transducer 52, while fixed to support 29 of the transducer 52 is a stem 32 carrying the magnetic core, which is not visible.

An electric cable connecting transducer 52 to a power supply, processing and indicating unit, is not shown.

The arm-set of the gauge is protected by two elements, i.e. a cover 33—made of stamped plate—, which encircles integral element 3 and an annular element 37 which is encircled by arms 4 and 5. Cover 33, which has a cylindrical surface and an annular upper base, is fastened to support 1 by screws 34, only one of which is visible in FIG. 1.

Cover 33 has two openings 35 and 36, aligned with feelers 12 and 14, which permit adjustment of feelers 12 and 14, by operating from the outside.

Annular element 37 constitutes protection and centering means because it protects measuring arms 4 and 5 when inserting part 17 and provides centering of the gauge with respect to part 17. Annular element 37 is fastened to support 1 by screws 38, one of which is visible in FIG. 2. Element 37 has two U-shaped openings 39 and 40, aligned with feelers 12 and 14, for permitting the feelers to protrude internally with respect to element 37.

Support 1 can be secured to a base 41 by screws 42, one of which is visible in FIG. 2. For coupling the gauge to a handle 43, handle 43 is locked to base 41 in a way not shown.

In this case, the electric cable which outputs the signal detected by transducer 52 passes through base 41 into handle 43, via an opening 44 defined in base 41.

The operation of the ring gauge is now described.

The gauge is initially zero set on a cylindrical master part having a diameter equal to the nominal diameter of the parts 17 to be checked. The mechanical zero setting operation consists of adjusting the position of feelers 12 and 14 with respect to arms 4 and 5 until the power supply, processing and indicating unit provides an indication sufficiently next to zero. A subsequent electrical zero setting, by means of a potentiometer of the power supply, processing and indicating unit, permits the obtainment of an indication corresponding to the zero value.

Then the gauge is manually applied to a part 17 to be checked.

If the gauge is not provided with handle 43 and support 1 is laid on a flat surface, the part 17 is manually inserted within the gauge, i.e. within element 37. In this case the electric cable emerges from the gauge through an opening, not shown, in cover 33.

Feelers 12 and 14, by entering into contact with part 17 cause rotations of arms 4 and 5 about portions 7 and 8. The moving away of arms 4 and 5 causes changing of the electric signal provided by differential transducer 52, the changing being detected and indicated by the power supply, processing and indicating unit.

As previously mentioned, there ae two pairs of holes 10, 16 and 11, 47 (FIG. 3) which can house feelers 12 and 14. This feature permits checking of difficultly accessible surfaces, i.e. surfaces which are difficult to insert within the gauge.

Figure 3:
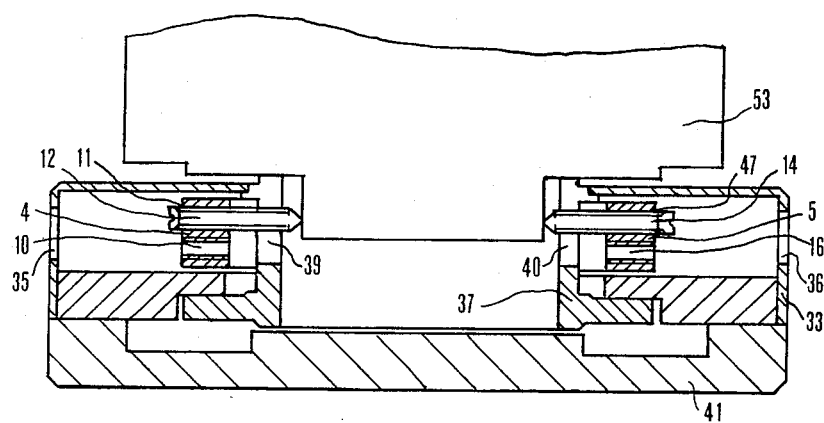
FIG. 3 shows the gauge of FIGS. 1 and 2 applied for checking a short cylindrical jut of a part.

If, for example, it is desired to check, in parts 53, the diameter of cylindrical portions slightly protruding from the other portions of the parts 53, that might be impossible by using a ring gauge having a pair of feelers arranged approximately midway of the gauge thickness. Thus, as shown in FIG. 3, the feelers 12 and 14 can be engaged into holes 11 and 47.

Figure 4:
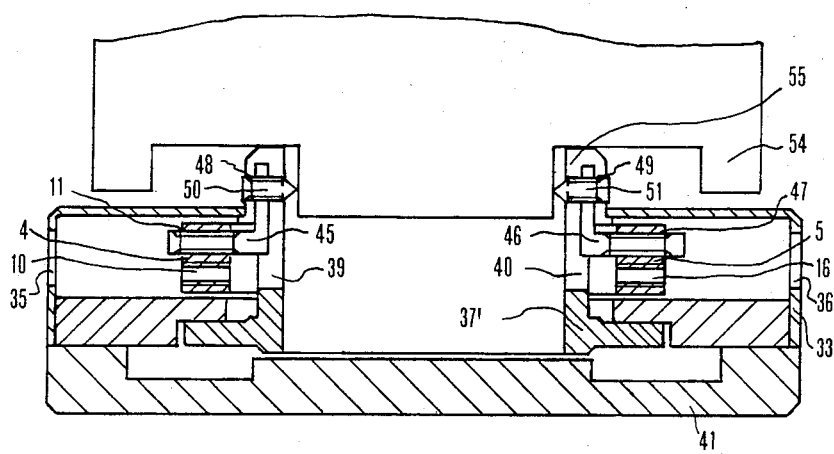
FIG. 4 shows the gauge of FIGS. 1 to 3 with some variants, for permitting checking of a cylindrical jut located within a recess of a part.

However, not withstanding the possibility of two different locations for each feeler 12 or 14, it may happen that a cylindrical surface to be checked is not accessible, as shown in FIG. 4.

The part 54 shown in FIG. 4 has a recess terminating with an annular shoulder. A cylindrical surface, the diameter of which must be checked, protrudes from the annular shoulder and is mostly arranged within the recess.

This measurement problem is solved by using two extension elements 45 and 46, which are engaged in holes 11 and 47, respectively; the extension elements 45 and 46 are substantially L-shaped and have threaded holes 48 and 49 housing the stems of feelers 50 and 51 adapted to contact the above-mentioned cylindrical surface of part 54. Thus, feelers 50 and 51 may be arranged at a determined distance, along a direction perpendicular to arms 4 and 5, from the same arms 4 and 5.

In this modified embodiment the protection annular element 37' has a particular shape, because it features a hollow, annular reference jut 55, for preventing contact between the part 54 and extension elements 45 and 46. The extension elements 45, 46 are partially housed within the hollow jut 55.

During measurement taking, jut 55 is partially inserted within the recess of part 54 and the end of jut 55 is adapted to contact the annular shoulder of part 54, thus defining the cross-section of the cylindrical surface where measurement is performed.

What is claimed is:

1. A ring gauge for checking external diameters of parts, comprising:
   support means;
   two movable measuring arms having first ends movably coupled to the support means for performing angular displacements, the measuring arms having substantially oppositely arcuated shapes and defining relevant free ends;
   two feelers respectively fixed at substantially intermediate sections of the measuring arms for contacting the surface of the part to be checked; and
   transducer means including two elements respectively fixed at the free ends of the measuring arms, for providing a signal depending on the mutual positions of the feelers.

2. The gauge according to claim 1, comprising an integral member, the integral member including: said measuring arms, two resiliently deformable portions defining two geometric axes about which the measuring arms can perform said angular displacements, and an intermediate portion fixed to the support means.

3. The gauge according to claim 1, wherein each of said intermediate sections of the measuring arms defines a plurality of seats for selectively housing the feeler fixed to the relevant arm.

4. The gauge according to claim 2, wherein said seats include threaded holes and the feelers are adjustably and frictionally secured in the holes through self-locking threaded inserts.

5. The gauge according to claim 1, further comprising a substantially annular element fixed to the support means and arranged between the measuring arms, for protecting the measuring arms and centering the gauge with respect to the part to be checked, the annular element defining openings for the passage of the feelers.

6. The gauge according to claim 1, further comprising two stop elements adjustably fixed at the free ends of the measuring arms, respectively, for limiting the angular displacements of the measuring arms towards each other.

7. The gauge according to claim 6, further including two further stop elements fixed to the support means for limiting the angular displacements of the measuring arms away from each other.

8. The gauge according to claim 1, further comprising a resilient element coupled at the free ends of the measuring arms for urging the measuring arms towards each other.

9. The gauge according to claim 1, wherein the feelers are coupled to the measuring arms through extension elements, for arranging the feelers at a determined distance, along a direction perpendicular to the arms, from the relevant measuring arms.

10. The gauge according to claim 1, wherein said support means comprise a substantially annular element with a flange, the measuring arms being coupled to the flange.

11. The gauge according to claim 10, comprising an integral member, the integral member defining said measuring arms, two resiliently deformable portions defining two geometric axes about which the measuring arms can perform said angular displacements, and an intermediate portion coupled to said flange.

12. The gauge according to claim 10, further comprising a cover fixed to said substantially annular element, the cover including a surface encircling the measuring arms and an annular base.

13. The gauge according to claim 12, wherein the feelers are adjustably coupled to the measuring arms and wherein said cover defines two openings for permitting adjustment of the feelers.

14. The gauge according to claim 9, for checking a cylindrical portion of a part, said cylindrical portion protruding from a shoulder of the part and being located within a recess of the part, wherein the gauge further comprises a substantially annular element fixed to the support means and arranged between the measuring arms, for protecting the measuring arms and centering the gauge with respect to the part to be checked, the annular element defining a hollow annular jut housing said extension elements, the annular jut being adapted to be inserted within said recess and to contact said shoulder, the jut having two openings for the passage of the feelers.

15. The gauge according to claim 10, wherein said support means comprise a base coupled to the substantially annular element, the gauge further comprising a handle coupled to said base.

16. A ring gauge for checking external diameters of parts, comprising:
support means;
an integral member including a first, intermediate portion fixed to the support means, second and third portions resiliently deformable for defining two parallel geometric axes of rotations, and fourth and fifth portions respectively connected to the second and third portions, the fourth and fifth portions defining two oppositely arcuated measuring arms angularly movable about said axes of rotation, each of the movable measuring arms having a free end;
two feelers respectively coupled to the arcuate measuring arms, substantially at intermediate points thereof, for contacting diametrally opposite points of the part to be checked; and
a position transducer including two elements respectively coupled at the free ends of the measuring arms.

17. A ring gauge for checking external diameters of parts, comprising:
a substantially annular support element;
an integral member including a first, intermediate portion fixed to the annular support element, second and third portions connected at opposite ends of the first portion, the second and third portions being resiliently deformable for defining two parallel geometric axes of rotation, and fourth and fifth portions respectively connected to the second and third portions, the fourth and fifth portions defining two measuring arms, wherein the measuring arms have substantially opposite semicircular shapes and relevant free ends and are angularly movable about said axes of rotation;
two feelers respectively fixed to the measuring arms, approximately midway of the longitudinal development of the relevant arm, for contacting diametrally opposite points of the part to be checked;
a position transducer including two elements respectively coupled at the free ends of the measuring arms;
displacement limiting means including stop elements adapted to cooperate with the free ends of the measuring arms for limiting the angular displacements thereof;
a protection cover fixed with respect to the annular support element, the cover defining a surface encircling said integral member; and
protection and centering means including a protection and centering element, substantially annular, this element being arranged between the measuring arms and defining openings for the passage of the feelers.

18. The ring gauge according to claim 17, wherein the feelers are adjustably coupled to the measuring arms and said protection cover defines two openings for permitting the adjustment of the feelers.

19. The ring gauge according to claim 17, wherein each measuring arm defines a plurality of seats situated approximately midway of the longitudinal development of the measuring arm.

20. The ring gauge according to claim 17, for checking a cylindrical portion of a part, said cylindrical portion protruding with respect to a shoulder of the part and being at least partially located within a recess of the part, further including two extension elements for securing the feelers to the measuring arms and wherein said protection and centering element defines a hollow annular jut housing the extension elements, the annular jut being adapted to be inserted within the recess of the part and to contact said shoulder, the jut defining said openings for the passage of the feelers.

* * * * *